US005267709A

United States Patent [19]

Koharcheck et al.

[11] Patent Number: 5,267,709
[45] Date of Patent: Dec. 7, 1993

[54] VARIABLE POWER CONVEYANCE APPARATUS

[75] Inventors: Alan W. Koharcheck, Temple City; Robert L. Simons, San Dimas, both of Calif.

[73] Assignee: Lucas Western, Inc., Brea, Calif.

[21] Appl. No.: 884,649

[22] Filed: May 15, 1992

[51] Int. Cl.⁵ .............................................. B64C 1/22
[52] U.S. Cl. .............................. 244/137.1; 244/137.2; 198/573; 198/718
[58] Field of Search ...................... 244/137.1, 137.2; 198/592, 861.5, 573, 718; 414/537

[56] References Cited

U.S. PATENT DOCUMENTS

| | | | |
|---|---|---|---|
| 3,047,127 | 7/1962 | McGow | 198/718 |
| 3,942,625 | 3/1976 | Snead | 198/573 X |
| 4,225,926 | 9/1980 | Wendt | 244/137.1 X |
| 4,662,809 | 5/1987 | Sturtz et al. | 414/347 |

*Primary Examiner*—Margaret A. Focarino
*Assistant Examiner*—Christopher P. Ellis
*Attorney, Agent, or Firm*—Pretty, Schroeder, Brueggemann & Clark

[57] ABSTRACT

A variable power conveyance apparatus for propelling loads under environments where the angle of inclination of a conveyance path may change. For these apparatuses, in particular, those located in aircraft cargo bays, drive units are constructed to drive heavy loads under all conditions, including up a slope. These drive units may be organized into sets for loading pallets into and out of the aircraft and along the left and right storage tracks within fore and aft sections of the aircraft. An inclinometer senses the aircraft's angle of inclination and generates a representative electronic signal. Control logic determines whether to apply, via an SCR circuit, a minimum voltage or a greater variable voltage if the selected set of drive units is called upon to drive the pallets up a slope. Three-phase voltage supplied to the selected set of drive units is thereby altered to provide only that voltage necessary to convey loads, and thus facilitates stalling of drive units supporting loads that have reached an end stop. This eliminates unnecessary roller wear and cargo deck maintenance.

31 Claims, 4 Drawing Sheets

VARIABLE POWER CONVEYANCE APPARATUS

BACKGROUND OF THE INVENTION

This invention relates to a cargo handling system that manipulates loads and pallets within the cargo bay of a wide-bodied aircraft. In more general terms however, the teachings and principles of the invention may be applied to any conveyance system where it is desired to propel a load from one point to another.

"Cargo Power Drive Units," or "cargo PDUs," are part of an integrated system for conveying aircraft loads within an aircraft's interior. Luggage and other cargo are typically loaded into large metal bins that may be easily moved into the aircraft, to quickly prepare the aircraft for departure, and easily unloaded from the aircraft upon arrival. These metal bins fit into the belly of the aircraft, and are stacked within the aircraft along its length for flight. Large cargo loaders are used to load these bins through a cargo bay door of the aircraft, so that the bins may subsequently be moved along the length of the aircraft and stowed.

A cargo PDU is an electro/mechanical roller device that propels these loads within the aircraft, both from side-to-side and along the length of the aircraft. There are other applications and configurations for these PDUs and their support elements within the cargo bay. For example, their arrangement and configuration may depend upon the type of aircraft and whether the aircraft is configured to transport cargo, or just passengers. The aircraft cargo bays may typically contain many different types of loads and pallets besides the metal bins just mentioned.

Figure 1:
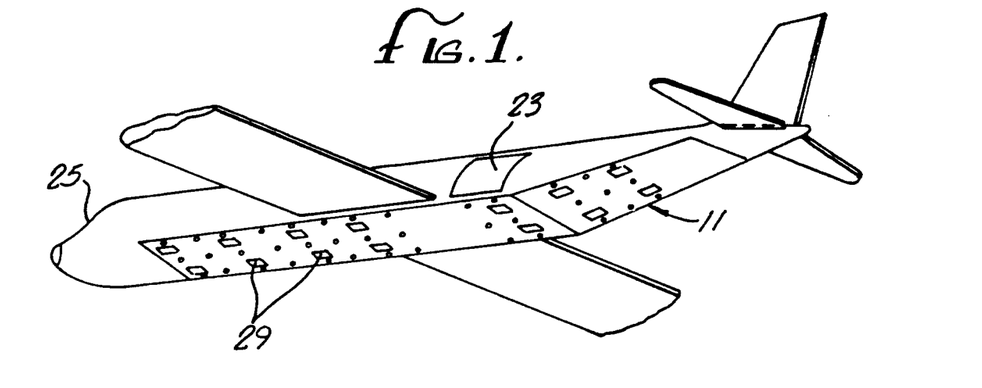
FIG. 1 shows an illustrative view of an aircraft having a lower deck cargo system which embodies the principles of the current invention.
Figure 2:
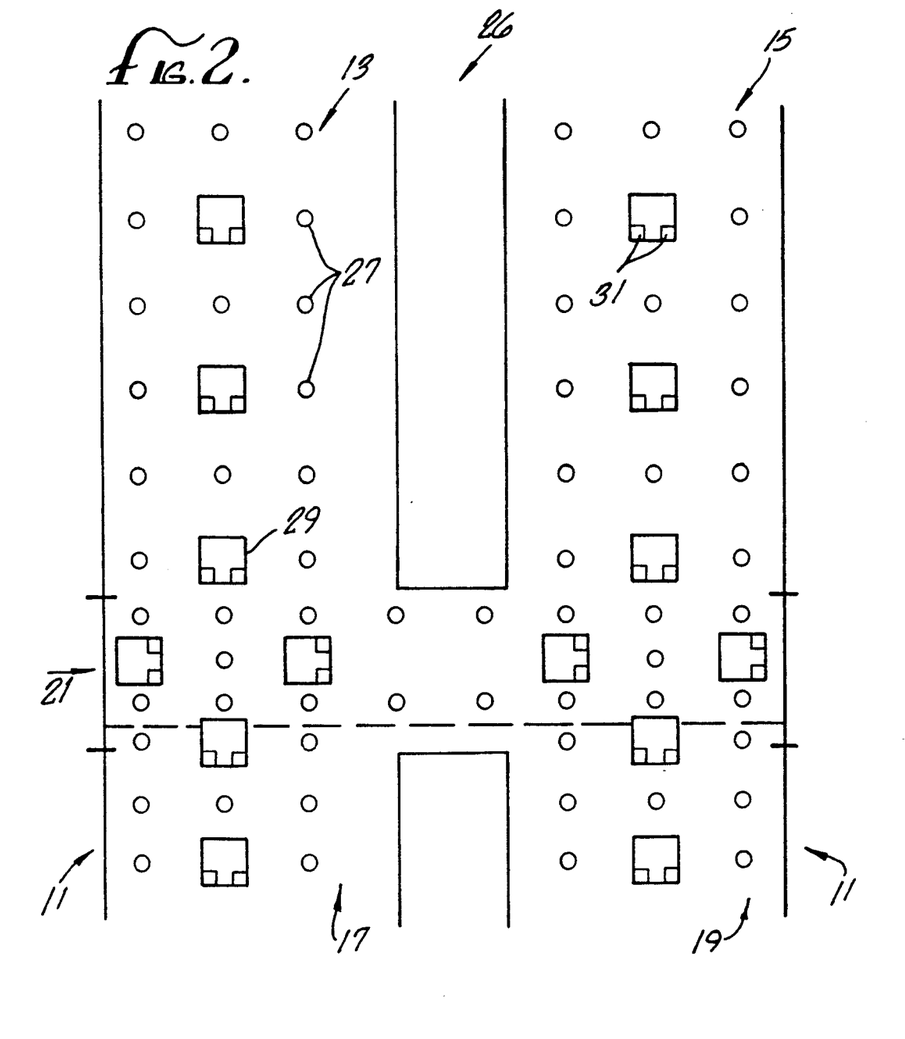
FIG. 2 shows a plan view of a portion of the cargo system shown in FIG. 1, including five sets of drive units and freely-rotating support bearings that support loads and pallets conveyed by the cargo system.

These loads and pallets are normally supported by a system of freely rotating bearings, as shown in FIGS. 1 and 2, that support the loads and pallets and enable them to be easily pushed within the aircraft to their intended position. Cargo PDUs were developed to enable these loads and pallets to be so positioned without requiring extensive manpower. Thus, with cargo PDUs, it is possible for a single operator to electronically control the manipulation of these loads and pallets within the aircraft's cargo bay.

Cargo PDUs are most feasible in large aircraft where many loads must be accommodated, and therefore typically find their home as part of an integrated conveyance system aboard a wide-bodied aircraft. Groups of these cargo PDUs are intermittently placed along the length of the aircraft in one or more rows so that multiple containers may be moved and positioned within the aircraft's belly.

Some of the first cargo PDUs consisted of tires having two motors and a gearing system, and were normally hidden below the cargo deck. The tires were actuated by the first motor to raise up above the cargo deck for driving the load. The second motor then caused rotation of the tire so that the loads could be mechanically positioned within the aircraft. However, these early systems had several faults: Besides requiring a large amount of room beneath the floor of the cargo bay for their installation and support, these systems would lock in the event of a power failure, preventing ready manual unloading of the aircraft's cargo bay. That is, if power was unavailable, these tires were locked in position above the cargo deck, and thus prevented the pallets and loads in the cargo bay from being manually pushed over the freely rotatable support bearings that would enable their ready movement if the cargo PDUs were not present. With other similar cargo PDUs, the raising and lowering of these rollers was accomplished by a mechanical system that was separate from the motor used to rotate the wheel. These faults were not relieved by implementation of these mechanical systems, because they too required extensive manpower.

In the late 1960s and early 1970s, a breakthrough was developed. A company called Western Gear developed a "self-lifting cargo PDU." That is, Western Gear developed a power drive unit that used the same motor both to lift a roller from beneath the cargo bay floor into a position to where it would contact a load or pallet riding on the bearing support system, and also to rotate the roller so that the load could be propelled. Since the same motor performed both functions, the rotation of the roller was mechanically connected to the mechanical elements that caused the roller to lift through the cargo bay floor. If the power was unavailable and the motor was locked, the roller was not locked in an elevated position, but rather, would retract under the influence of gravity. Thus, if a power failure occurred, these new self-lifting cargo power drive units would retract and allow manual removal of loads and pallets in the aircraft's cargo bay.

This early basic innovation has enjoyed enormous success. Its principles have been used in nearly every type of wide-bodied aircraft to provide an efficient, mechanical system for loading and unloading aircraft cargo bays. In addition, these self-lifting cargo PDUs were shallow in profile and thus could easily be mounted in an aircraft cargo bay without requiring much space or weight.

Naturally, many have strived to make superior cargo power drive units that would operate even more efficiently. The two primary design considerations that faced makers of cargo power drive units were (1) the weight of each unit, since this could significantly affect an airline's fuel costs over time, and (2) long life and reliability.

An aircraft may have several different banks or sets of cargo PDUs. For example, in a typical configuration, an aircraft will have two cargo bays, each divided into two sections, front and back, each section having cargo PDUs organized into left and right tracks. The aircraft may also have an additional track along the width of the aircraft, positioned at the door, to allow loads to be moved into and out of the aircraft through the cargo bay doors and also transferred between the left and right cargo PDU tracks. Some newer aircraft may also feature an additional "kink" section, or sloped section in the aircraft's tail, which may have additional left and right cargo PDU tracks. The aircraft 25, shown in FIG. 1, is one illustrative configuration and features one cargo bay, having a front section and a rear "kink" section 11, which has a different angle of inclination from the rest of the cargo bay.

Each set of PDUs, consisting of a plurality of PDUs arranged along a path of conveyance, are driven in common. That is, an operator manipulating the PDU controls, which consist essentially of an on/off switch and a joy stick, will cause all of the PDUs in a given set to lift and rotate in the same direction at the same time. This enables the operator to simultaneously move more than one pallet or load within the aircraft. In the system shown in FIGS. 1-2, there are thus five sets of cargo PDUs: Front section left and right track sets 13, 15, rear (kink) section left and right track sets 17, 19, and a lateral set 21 positioned at the cargo bay door 23 that connects left and right tracks at the front/rear section junction.

For example, as there are typically numerous loads to be stowed within the aircraft, several loads are manipulated simultaneously by one energized set of cargo PDUs. However, a first load or pallet reaching the end of the aircraft will be blocked, and unable to move further while the entire set of energized cargo PDUs continues to rotate in elevated condition and propel the remainder of the loads or pallets along the length of the aircraft. The rollers underneath a jammed load thereby abrasively "scrub" the bottom of the load, causing damage to the pallet and wear to the PDU wheel or roller. The rubber material of the PDU, when so damaged, causes rubber dust to be generated, which further increases required maintenance to the aircraft cargo bay. This "scrubbing" is perhaps the most significant obstacle to PDU roller life.

Solutions have been proposed to solve the proble of cargo PDU roller wear. Most of these have consisted, however, of attempts to construct the cargo PDU roller or wheel out of a rubber material that is not easily worn by the scrubbing activity. While these solutions have helped, they have not eliminated the problem.

In an optimal environment, it is desired that whenever a load or pallet hits an end stop, cargo PDUs beneath the load or pallet should be stalled such that the roller no longer rotates in trying to propel the load or pallet. Of course, once a PDU is stalled, any scrubbing is stopped because, although the roller remains in contact with the load's bottom, the roller stops rotating. This "stalling" may be achieved by virtue of the fact that cargo pDUs are driven by electric motors that utilize a maximum of three-phase two-hundred volt voltage (at 400 hertz). Thus, when the roller is prevented from rotating, it is desired that the resistance to the motor causes the motor to cease operation until reenergized.

In current configurations, however, the maximum voltage is always supplied, because aircraft bays may vary in their orientation to gravity. Most airports are sloped at a slight angle away from passenger terminals to allow proper drainage. Thus, a normally level aircraft cargo bay may have gravitational tilt (longitudinal) or roll (lateral), or both, during normal loading and unloading. Since the force of roller rotation is proportional to the inverse square of the cargo PDU supply voltage, the maximum of two-hundred volts is typically applied to all energized cargo PDUs, to enable their continued operation in all environments, including worst case situations involving maximum tilt.

The force required by a cargo PDU to propel a load may vary greatly depending upon the angle of inclination. For example, a PDU may typically require a force of 35 pounds to move a load on a level surface. When the load must be propelled against a 3 degree inclination, this force may be increased to in excess of 200 pounds. To solve this problem, the maximum of two-hundred volts is supplied to all energized PDUs. That is, PDUs are always operated under the worst case assumptions and supplied with two-hundred volts, and thereby always supply over 200 pounds of roller drive force. This greater force makes it very difficult for jammed loads to stall underlying PDUs and thus is a primary cause of the "scrubbing" problem. PDUs do not, in fact, always require the maximum supply voltage, because cargo bay tilt or roll is usually minimal. Even when an aircraft bay is significantly tilted, only a few of the load conveyance paths face an uphill slope.

Thus, there is a need for an invention that provides for less scrubbing and cargo bay maintenance necessitated by roller wear, and that facilitates stalling when a load contacts an end stop or is otherwise prevented from moving. The current invention satisfies this need, and provides a new generation of cargo systems that present a significant advance and improved efficiency as yet unachieved by the systems described above.

SUMMARY OF THE INVENTION

The invention as defined by the appended claims may be characterized as (1) a conveyance apparatus for propelling a load along a plane of conveyance, and (2) a power control device for use in conveyance.

The conveyance apparatus of the current invention includes three elements. First, it includes a propelling device that propels the load along a conveyance path within the plane of conveyance. This propelling device may equivalently include any cargo power drive unit used in the aircraft's cargo industry, such as a self-lifting cargo PDU, a spring lifted cargo PDU, a dual-actuator cargo PDU, a rotating tire device, a tow bar, etc. The invention is not specifically limited to use of these types of propelling device, however, and it may be applied to any type of device used to propel a load, i.e., a conveyer belt device.

The conveyance apparatus also includes a sensor that senses a force opposing conveyance of the load. In the preferred embodiment, discussed below, the sensor utilized is an "inclinometer" that measures the slope of the path of conveyance, from which driving power may be varied to compensate for uphill or downhill conveyance. The inclinometer thus provides an indication of a component of the force of gravity that opposes conveyance of the load, and effectively, the force required to stall the propelling device. As examples of design options, the sensor could include several inclinometers, or means for approximating any element of any other force that opposes the conveyance of the load.

Lastly, the conveyance apparatus of the current invention includes a control element that varies the mechanical power applied to the propelling device. In the preferred embodiment, this control element is an electronic circuit that varies the voltage applied to a motor of the propelling device, and thereby varies the torque provided by a motor's mechanical elements. However, the control element may include any device that can adjust the output of the propelling device to compensate for the force opposing conveyance of the load, or that can facilitate stalling of the propelling device in response to that force opposing conveyance. As an example, the control element might be primarily mechanical, and employ gearing or a bearing arrangement to adjust mechanical force to be applied to the load.

In another aspect of the invention, a power control device is used in connection with one or more propelling device sets, each set consisting of one or more propelling devices operated in parallel. It includes three elements. The first is means for selecting a set of drive units. The second element is sensing means for sensing a force opposing the conveyance of a load by the selected set of propelling devices, the sensing means providing a signal indicative of that force. Lastly, the power control device includes means for varying electric power provided to the motors of each propelling in a selected set in response to the signal indicative of the force opposing conveyance.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

DETAILED DESCRIPTION

This invention provides a conveyance apparatus that allows PDU voltage to be particularly varied to the conveyance task. This eliminates scrubbing to an amount heretofore unknown an unexperienced in the utilization of such cargo systems. Thus, scrubbing will be avoided when, as a load contacts an end stop, PDUs attempting to drive that load are stalled. This increases PDU roller life several fold and drastically reduces the wear on the bottom surfaces of the loads or pallets.

The present invention is embodied in an improved aircraft cargo conveyance system, that is, a cargo system that is mounted within an aircraft 25 to drive large bins and pallets which may be loaded for flight. Since airports are sloped away from passenger terminals to provide for ready drainage, aircraft may undergo a slight longitudinal tilt or roll (roll is tilt along the width of the aircraft from wing-tip to wing-tip) while the aircraft is being loaded or unloaded with these bins.

The preferred embodiment of the present invention is shown with reference to the accompanying FIGS. 1-5. FIG. 2 shows a generally H-shaped conveyance surface 26 mounted in the lower deck of an aircraft, and a cargo bay loading door 23. It is emphasized that there are many dozens of aircraft cargo deck configurations. Some aircraft, particularly configured for cargo, feature the upper passenger deck removed within an additional larger cargo deck installed. Other aircraft may feature three or more longitudinal tracks rather than the H-shape shown above. This invention applies to every such system.

As shown in FIGS. and 2, the H-shaped cargo surface includes a system of freely rotating bearings 27 which are mounted in the cargo deck. Under normal conditions, loads or bins loaded into the aircraft may be easily manually moved throughout the cargo bay upon this system of freely rotating bearings. However, it is desirable to electromechanically propel these loads with minimal manual assistance.

To this end, the H-shaped cargo surface includes a number of power drive units, or "PDUs" 29, that assist the bearing support structure in supporting the loads, and propel the loads over the system of freely rotating bearings as directed by a human operator. Each PDU typically includes a roller element 31 which is raised from a normal position beneath the cargo deck up to a rotating elevated position. In this position, it contacts and drives overlying loads that ride upon the bearing system.

These days, PDUs are typically rectangular with a translatable frame that mounts both the electric motor and roller element 31. Examples of such PDUs may be observed in more detail by reference to U.S. Pat. Nos. 3,690,440, 3,698,539, 3,737,022, 3,565,233, 3,613,852, 3,631,934, 3,741,504, 4,697,694, and 4,792,037. It is emphasized, however, that the PDUs referred to herein may include any device typically used to propel a load on a conveyance surface which may experience tilt, and may include, for example, conveyor belts and other load-propelling devices. The basic structure and operation of the PDUs preferably utilized will be elaborated upon below.

The illustrated H-shaped conveyance surface 27 includes two tracks, a left track and a right track, along which bins are be stowed in parallel for aircraft flight. As the aircraft fuselage narrows at the aircraft's tail, the cargo deck is separated into a tail section 11, which may be tilted slightly upwards to provide for additional cargo storage space. In the example shown in FIG. 1, the kink section 11 is tilted upwards from the main section towards the tail at an angle of 1½ degrees. In addition to the four track sections just described, namely the left and right main sections 13, 15, and left and right kink sections 17, 19, there is an additional path 21 between both tracks located at the cargo door and at the junction of the main and kink sections. This horizonal path is used to both move loads into and out of the aircraft and to transfer them between the left and right storage tracks.

The manipulation of cargo loads into and within the aircraft 25 may be controlled by a single human operator, who manipulates operator controls 33 to control the energization of power drive units 29 among the five aforementioned sections 13, 15, 17, 19 and 21. Typically, these controls 33 are mounted in a hand-held pendant unit Connected to a PDU power relay box 59 by a cable. Alternatively, the control elements may be mounted to a wall or other structure within the cargo bay. These controls will usually have an on/off switch and a joy stick which, depending upon the direction pushed, will momentarily energize a set of pDUs 13, 15, 17, 19 or 21, causing the roller element 31 to be elevated and rotated in one or two possible directions. By "momentarily energize", it is meant that a section of PDUs will remain energized as long as the joy stick is held in a certain position. When the joystick is released, the set of PDUs selected are de-energized and return their roller elements to their normal position below the plane of the load's conveyance.

Figures 3, 4:
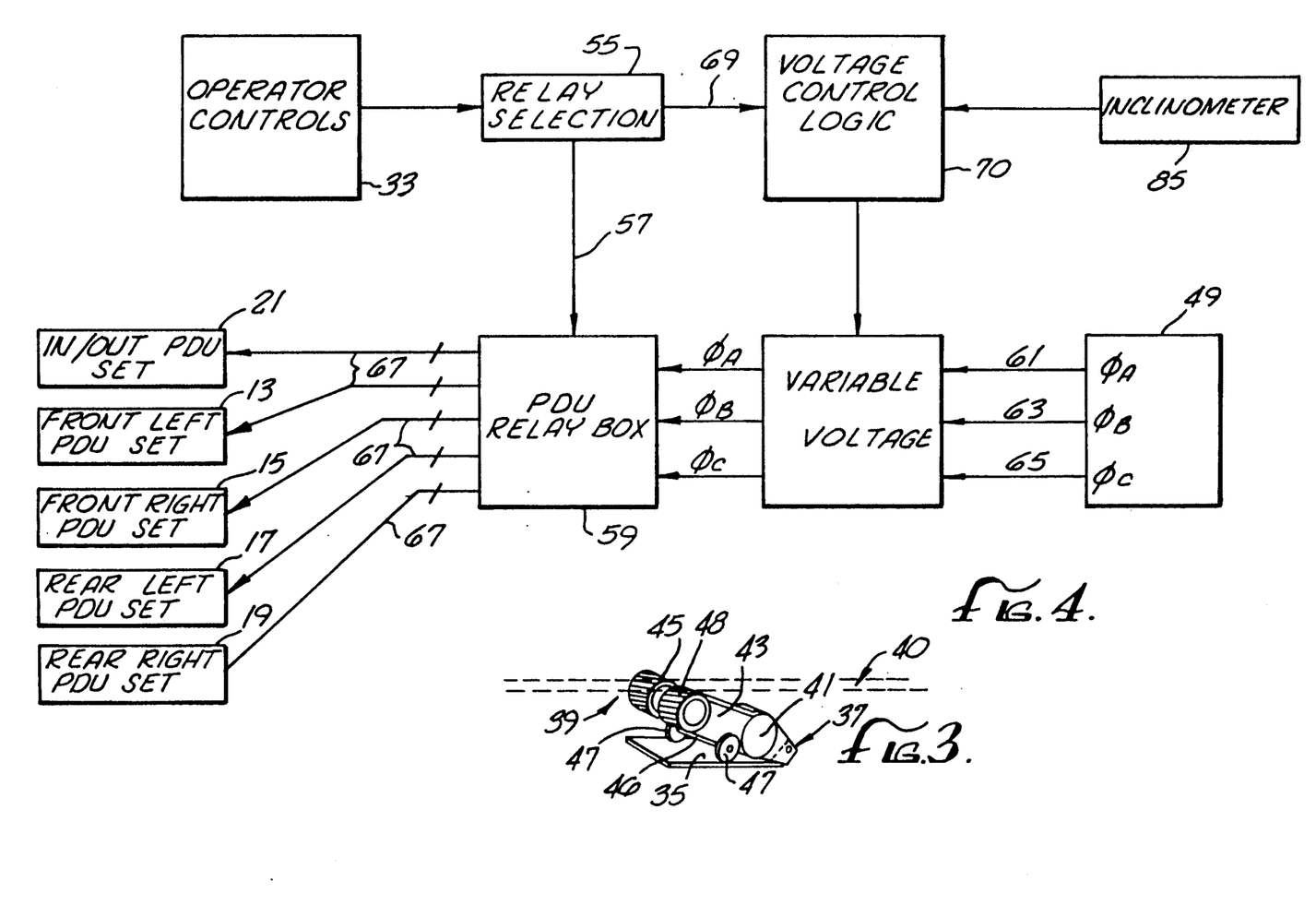
FIG. 3 shows an illustrative view of a particular type of PDU utilized in the cargo system shown in FIGS. 1 and 2.
FIG. 4 shows a block diagram that illustrates control of the cargo system of the current invention, and interaction of the power control circuit of the current invention with the cargo system in general.

As seen in FIG. 3, typical PDU 29 includes a base 35, which is mounted to the aircraft 25 below the conveyance plane, and a translatable frame 37, Which is pivoted upon an axis such that a swinging end 39 is elevated towards the cargo deck and the plane of conveyance 40. The translatable frame carries on it a motor 41, reduction gearing 43, a roller element 45 for contacting and propelling the load, and a cam element 47 for causing the frame's translation towards the plane of conveyance.

When energized with a three-phase, four-hundred hertz, two-hundred volt power supply 49, each PDU's motor 41 begins to pass torque to the reduction gearing 43. The direction of motor rotation is dependent upon the relative phases of the power supplied. If it is desired to rotate the motor 41 in reverse fashion, two of the three phased voltage supply lines 61, 63, and 65 are interchanged to reverse the power supply's influence upon the motor 41. While in most prior art configurations, a maximum 200 volt line-to-line voltage is always applied to drive motors 41, it has been found that for a level surface, a voltage level of less than 100 volts will typically allow a PDU 29 to drive a load or pallet and be easily stalled when that load or pallet contacts an end stop.

The torque provided to the roller element 45 by the reduction gearing 43 is simultaneously applied to a rockable shaft 46 on which the cam element 47 rides. The roller element 45 is fitted with a viscous drag 48 that impedes the roller element's rotation. As a result, the motor's torque is passed almost entirely to the rockable shaft 46, causing the cam element 47 to rotate, and to translate the frame 37 towards the conveyance plane. The PDUs 29 are mounted close enough to the plane of conveyance that very little translation is needed to bring the roller element 45 to a position where it may contact the load.

When the roller element 45 has been elevated to contact a heavy load, or when the swinging end 39 has reached the highest point it is permitted to travel, the resistance to translation becomes greater than the resistance to the roller element's rotation, and the motor's torque is passed to the roller element 45 to cause it to rotate. Because of the gearing configuration, the roller element will rotate in one of two directions depending upon the direction of motor shaft rotation.

PDUs 29 are typically 4-inch wide rectangular trays that may be easily mounted within the aircraft cargo deck and do not require great depth. They may thus be easily removed for maintenance.

As explained in the background section above, each PDU 29 is manufactured such that the full two-hundred volt line-to-line voltage Will cause it to supply enough force to drive a load under worse case conditions, that is, driving a load up a surface which is inclined by up to three degrees against the force of gravity. This generally creates roller scrubbing and causes dust to be deposited beneath the conveyance plane, requiring further maintenance and causing further roller wear when the cargo PDU is operating against an angle of less than three degrees.

The cargo system of the present invention, however, incorporates special electronics that adjust the power supplied by lines 61, 63 and 65 to the PDUs 29 in order to meet their demands. With this lower supplied power, a PDU motor will be more easily stalled if the roller element 45 experiences sufficient resistance, as when a cargo load reaches an end stop or otherwise prevented from moving while riding upon the roller element 45.

With reference to FIG. 4, these electronics are described in more detail. The operator utilizes his controls 33 to select both a set of PDUs, 13, 15, 17, 19 or 21, for energization, and a direction that the load is to be propelled by those PDUs. Typically, the roller element 45 allows a given PDU 29 to propel a load only in two directions relative to the PDU's orientation, that is, forward and backward.

Figures 5, 5A:
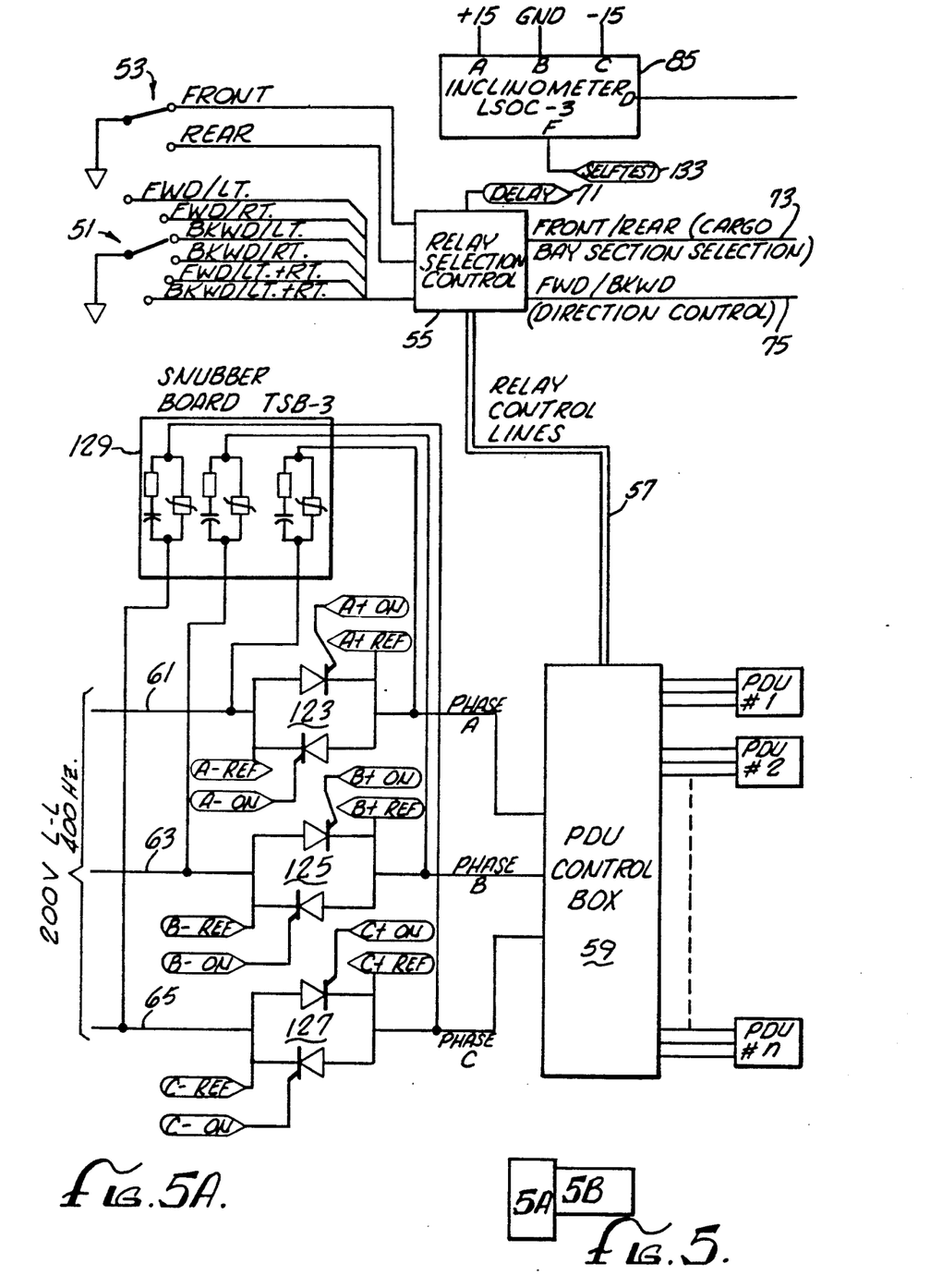
FIG. 5A is a first part of a two part schematic diagram of the components of a power control circuit of the present invention, including components that sense an angle of plane of conveyance and that adjust supplied power in response thereto; and, FIG. 5B is the second part of the schematic diagram of FIG. 5B, including components that interpret the sensed angle of the plane of conveyance and that control the adjustment of supplied power.

As shown in FIG. 5, the operator controls consist of a multiple-selection switch 51, which is a normally-open joystick and must be manually retained in position to maintain energization of the selected set of PDU's in a given direction, and a section selection switch 53 for selecting the front or rear sections of the cargo bay that the manipulation of the multiple-selection switch 51 is to govern. The in/out set of PDUs 21 is controlled in by a separate switch that is not shown in FIG. 5.

The operator controls 33 are connected to a relay selection control 55 that provides two sets of signals. A first group of twenty-eight volt control lines 57 couple the relay selection control 55 with a PDU relay box 59. These control lines 57 cause relays to switch three-phase power to the selected PDU set 13, 15, 17 or 19, to cause the selected PDU set to elevate their roller elements 45 for rotation in the selected direction. If the roller elements 45 are to propel loads forward relative to PDU orientation, each of the three power inputs lines 61, 63 and 65, corresponding to three-phases, are directly coupled to power lines 67 of the selected PDU set 13, 15, 17 or 19. If the backward direction is selected, the three power lines 61, 63 and 65 are also coupled to the selected PDUs, but with two of the phase lines interchanged.

The second set of control lines 69 couple the relay selection control 55 with voltage control logic 70, shown as a block in FIG. 4. With reference to FIG. 5, it is seen that the relay selection control 55 provides three digital signals 71, 73 and 75 to the voltage control logic. The first signal line 71 carries a delay signal generated by the relay selection control 55 every time the joy stick is engaged to select a set of PDUs 13, 15, 17 or 19. This delay signal will vary from zero to +15 volts over a period of 3 seconds, commencing upon selection of a set of PDUs 13, 15, 17 or 19. The voltage control logic 70 uses this signal to delay its regulation of PDU power. In other words, as each PDU set is energized, the voltage control logic 70 will allow the full 200 volts to pass to each PDU in the selected set to allow those PDUs to fully elevate their rollers for driving a load. At a threshold of approximately 3 volts, or about 1 second after the selected set of PDUs is energized, the voltage control logic 70 will allow PDU power to be regulated in accordance with a sensed angle of inclination of the conveyance plane 40. This feature is significant, because it provides for jogging loads temporarily under full power by repeated engagement of the joystick.

The second signal provided by the relay selection control 55 is a digital signal 73 that indicates whether the front 13, 15 or rear 17, 19 section of PDUs have been selected. A logical "1" indicates that the front section of PDUs has been selected, while a logical "0" indicates that the rear section PDUs have been selected. The third logic signal 75 provided by the relay selection control indicates whether the selected set of PDUs are to propel a load in either a forwards or backwards direction within the aircraft.

The two digital selection signals are passed through inverters 77 and "nand" gates 79 to provide signal outputs which respectively indicates rear section forwards travel, front section forwards travel, front section backwards travel, and rear section backwards travel. These signals are inverted by a second set of digital inverters 81 and passed to a set of "nand" gates 83 that are used to provide logical signals that indicate whether the selected set of PDUs 13, 15, 17 or 19 are to receive a minimal amount of power or a quantity varied in response to an angle of the plane of conveyance.

Figure 5B:
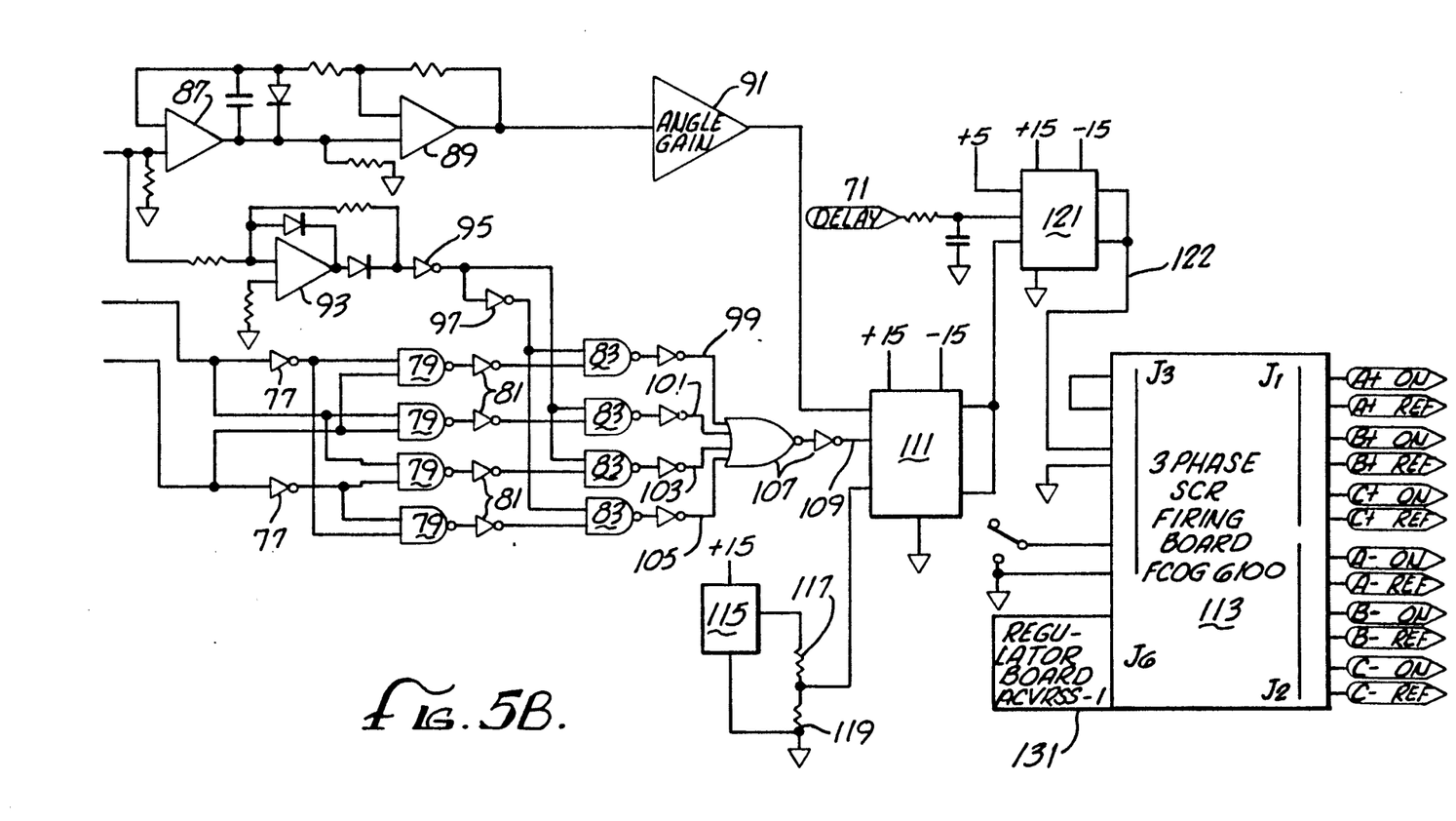

This gate logic, shown in FIGS. 5A and 5B, results in the supply of power to the selected set of PDUs as illustrated in TABLE 1.

TABLE 1

| | Desired Voltage Supply DIRECTION OF LOAD CONVEYANCE | | | |
|---|---|---|---|---|
| | Front Section | | Rear Section | |
| Aircraft Tilt | Fwd | Rwd | Fwd | Rwd |
| Nose Uphill | $V_{ANGLE}$ | $V_{MIN}$ | $V_{ANGLE}$ | $V_{MIN}$ |
| Nose Downhill | $V_{MIN}$ | $V_{ANGLE}$ | $V_{MIN}$ | $V_{ANGLE}$ |

The current system utilizes a single inclinometer 85 for sensing aircraft tilt. Aircraft roll from wing-tip-to-wing-tip is not considered a significant problem, because the in/out set of PDUs 21 near the cargo bay door 23 is in proximity to the human operator, who controls load manipulation. It is expected (1) that loads in this vicinity will not contact end stops or otherwise be blocked and (2) that this operator will be able to observe any unexpected stoppage occurring near his position at the cargo bay door 23 and thus avoid scrubbing by releasing the joy stick control. This arrangement is represented by the schematic of FIG. 5.

By contrast, it is within the principles of the invention to illustrate use of two or more inclinometers for sensing both aircraft pitch and roll and for controlling each set of PDUs 13, 15, 17, 19 and 21 accordingly. Future systems may well utilize this implementation, which could feature.

As shown in FIG. 4, the inclinometer 85 is a model number "LSOC-3" available from Lucas-Schaevitz, Inc., of Pennsauken, N.J. It operates as an electronic balance and provides a ± data output corresponding to the sine of its angle of inclination with respect to gravity. This output flows through two paths in the voltage control logic. The first computes the absolute value of the sine output of the inclinometer. Two op-amps circuits 87 and 89 provide, respectively, absolute value and gain. This signal is fed to an angle gain circuit 91, which then scales the output, as will be explained further below.

A third op-amp circuit 93 provides an output that represents the ± sign of the inclinometer output. The resistance values of this circuit 93 are selected to have a gain of approximately minus ten when the inclinometer output is negative, producing a logical "0" at the output of the inverter 95. The op-amp is shorted-out by a positive inclinometer output, producing a logical "1" at the inverter 95 output.

Through the use of another inverter 97, the "nand" gates 83 are called upon to compare the direction of conveyance with the angle of inclination to determine whether a minimum power is to be supplied to the PDUs 29, or power varied in accordance with an uphill conveyance slope. These "nand" gate outputs, 101 and 103, and 99 and 105, respectively indicate forward conveyance against an uphill slope and rearward conveyance against a negative slope, that is, where the aircraft nose is inclined downward with respect to the tail. These signals are then passed to an "or" gate 107, comprised of a "nor" gate and inverter, to indicate a logical "1" when voltage is to be varied with aircraft tilt, and a logical "0" output when the PDUs 29 are to receive minimum power, that is, when they are not called upon to drive loads uphill. This variable power selection signal is designated by the reference numeral 109.

The angle gain circuit 91, referred to above, receives a zero to +5 volt input that indicates the absolute value of the sine of the aircraft's angle of tilt. The angle gain circuit 91 configures this signal to be a minimum of +2.50 volts and a maximum of +5 volts, corresponding to the zero to +5 volt range of the sine signal input, delivered from the op-amp circuits 87 and 89. The output from the angle gain circuit 91 is fed to a single-pole, double-throw circuit 111, controlled by the variable power selection signal 109. If variable power is to be applied to the PDUs 29, the voltage output (+2.50 to +5 v) of the angle gain circuit 91 is coupled to a three-phase SCR firing board 113. If a minimal voltage is to be applied, variable power selection signal 109 directs the single pole, double-throw circuit 111 to apply a +2.50 volt signal to the three-phase SCR firing board 113. This latter +2.50 volt signal is generated by a precision 10 volt supply chip 115 with its +10 volt output passed across a voltage bridge consisting of two resistors 117 and 119. The first resistor 117 is selected to have a value of 1.875 k ohms and a 1% tolerance, while the second resistor 119 is selected to 635 ohms and a 1% tolerance.

The outputs of this first single pole, double-throw switch are coupled together and passed to a second single pole, double-throw switch, designated by the reference numeral 121. This second switch 121 uses the delay signal 71 from the relay selection control 55 to determine whether to apply maximum power to the selected set of PDUs 13, 15, 17 or 19. As a selected set of PDUs is energized, the delay signal 71 will increase from zero to approximately +15 volts over 3 seconds of time. As the delay signal reaches 3 volts, approximately 1 second after engagement of the PDUs, the second switch's (121) threshold will be crossed, and the switch will stop passing +5 volts and instead pass the 2.50 to 5 volt output of the first switch 111

The output of the second switch 121 is designated by the reference numeral 122, and is coupled to the three-phase SCR firing board 113, Part No. "FCOG 6100," available from Enerpro, Inc. of Goleta, Calif.

As shown in FIGS. 5A and 5B, the SCR firing board 113 provides six "on" signals that are utilized by the SCRs of FIG. 5A. These SCRs are used for phase control and are organized into three SCR pairs, organized into SCR circuits 123, 125, and 127, corresponding to the three-phased 200 volt voltages 61, 63 and 65 supplied by the power supply 49 to drive the PDUs 29. As each phased voltage 61, 63 and 65 varies sinusoidally (four-hundred times per second), the SCR circuits 123, 125 and 127 will allow only portions of sinusoidal waveform to pass to the PDU relay box 59 that are within a given range.

For example, each portion of each cycle of the sinusoidal waveform may be associated with a phase of −180 degrees to +180 degrees. The signal provided by the SCR firing board 113 will limit voltage passing each of the three SCR circuits 123, 125 and 127 to the two portions of the waveform corresponding to ± "x" degrees, where "x" is determined by the amount of voltage supplied by the three-phase firing board 113. A snubber board 129, part No. "TSB-3," available from Enerpro, Inc. of Goleta, Calif., provides a snubber circuit to reduce noise across each SCR circuit 123, 125 and 127.

Each SCR circuit 123, 125 and 127 is also tapped for two reference voltages which are fed back to the SCR firing board 113 and conveyed to a regulator board 131, part No. "ACVRSS-1," also available from Enerpro, Inc. of Goleta, Calif. As power utilized by PDUs driving a load will vary depending upon the load's requirements, the reference voltages tapped from the SCR circuits 123, 125 and 127 are used to analyze the power factor of power being supplied to the PDUs 29. In other words, as the PDU set's power requirements are increased, the voltage passed by the SCR circuits 123, 125 and 127 may vary even though the SCR firing board's +2.50 to +5 volt control voltage 122, which controls the SCR circuits, does not vary. The regulator board 131 samples the aforementioned referenced signals to adjust the SCR control signals from the firing board 113, such that the SCR circuits 123, 125 and 127 supply a constant voltage to the PDUs 29 in accordance with the inclinometer readings.

Thus, as an operator moves a joystick to energize a set of PDUs 13, 15, 17 or 19, the voltage control logic 70 reads the output from the inclinometer 85 and decides whether the selected set of PDUs and direction of propagation are such as to require a greater-than-minimum voltage. The SCR firing board 113 is instructed to control the three SCR circuits 123, 125 and 127 to allow each phased voltage 61, 63 and 65, respectively, to supply either a minimum 100 v voltage or a variable voltage, if the selected set of PDUs are called upon to drive a load up an incline.

To insure that the inclinometer 85 is operating correctly, a self-test signal will be generated when the PDU system is turned on. This signal's input to the inclinometer 85, designated by the reference numeral 133, will trigger a maximum output by the inclinometer to test if the inclinometer is working correctly. Although not illustrated in FIG. 5A, an additional circuit should be implemented, which upon receipt of the self-test signal 133, would test the inclinometer 85 output to verify a maximum output voltage. If the inclinometer 85 does not pass this self-test, the test circuit that is implemented must require the second switch 121 to always supply a maximum +5 volt control signal output 122 to the SCR firing board 113, to ensure that all PDUs 29 in the selected set 13, 15, 17 or 19 receive maximum power. One with a basic understanding of electronics would be readily able to design and implement such a circuit, and an explanation of its detail is not considered relevant to the principles of this invention or to the understanding of this preferred embodiment.

The block diagram of FIG. 4 shows the PDU relay box 59 as controlling five sets of PDUs, including an in/out set of PDUs 21 for moving loads laterally within the aircraft 25. Power to these in/out set of PDUs 29 should either be supplied through a separate PDU relay box, or alternatively, additional logic added to the schematic of FIG. 5 to provide a minimum voltage only if the in/out PDUs 21 are selected through the PDU relay box 59 illustrated in FIGS. 4 and 5. One with a basic understanding of digital electronics would easily be able to design and implement this operation.

An alternative embodiment features a sine control pulse width modulation device that replaces the SCR firing board 113 and SCR circuits 123, 125 and 127. This implementation creates, through a rectification, a 270 volt DC supply voltage from the power lines 61, 63 and 65. It also strips the three differently-phased 400 hz signals (creating five volt sinusoidal signals from the power lines 61, 63 and 65) and amplifies these signals using the +2.50 to +5 volt control signal 122. These signals are then compared with a 40 k hz sawtooth pattern to create three output signals matching the 40 k hz sawtooth at times when the absolute value of sawtooth voltage exceeds the absolute value of the 400 hz signals, such that the average time of sinusoidally varied duty cycles generated thereby are either increased or decreased in response to the control signal 122. These three signals then drive Insulated Gate Bipolar Transistor circuits, corresponding to the SCR circuits 123, 125 and 127, such that 3 differently-phased 200 volt signals are generated from the rectified power supply. The average voltage of these signals is controlled by the sinusoidally varied duty cycles to be between 100 volts and 200 volts in accordance with the principles discussed herein. Both this sine control pulse width modulation device and a standard pulse width modulation device are contemplated design alternatives and may be readily implemented using commercially available parts. As mentioned, these circuits may be substituted for the SCR firing board 113 and SCR circuits 123, 125 and 127.

From the foregoing, it is apparent that various modifications to the preferred embodiment described herein will readily occur to those of skill in the art. For example, the voltage control logic 70 could be separately mounted on each PDU 29 and wired to an inclinometer 85, depending upon the PDU's orientation. Alternatively, multiple inclinometers could be supplied for each set of PDUs 13, 15, 17 and 19, or the voltage control logic 70 made to compare the inclinometer output with the angle of a localized plane of conveyance 40 with respect to a known reference point. For example, since a kink section 11 in some aircraft are always inclined at an angle that is typically 1½ degrees to the other sections (either front, or front and rear both), the voltage control logic 70 could be made to adjust the inclinometer output for its comparison with inclination of the kink section of the cargo bay. The voltage control logic 70 would thus be able to separately compare the kink section to determine whether it was normally inclined at 1½ degrees, or postured at some different angle with respect to gravity. Additionally, two or more inclinometers could be provided to sense both tilt and roll, and voltage control logic 70 configured in some other way to read both inclinometer outputs in comparison with the selected set of PDUs for control of PDU power.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

We claim:

1. A conveyance system for conveying a load along a plane of conveyance, comprising:
   a propelling device that propels the load along the plane of conveyance;
   a motor coupled to said propelling device so as to provide power to said propelling device to propel the load;
   a sensor that senses a component of gravitational force presented by an angle of inclination of the plane of conveyance; and
   a motor control coupled to said sensor, said motor control also coupled to said motor in a manner to limit the power output by the motor in inverse relation to the magnitude of the component of gravitational force sensed by the sensor.

2. A conveyance system as in claim 1, wherein:
   said motor is an electric motor; and
   said motor control includes a variable power control coupling said motor and an electric power source of said motor, said power control varying electric power supplied to said motor in response to the sensed component of gravitational force.

3. A conveyance system as in claim 2, wherein said variable power control includes means for varying electric power supplied to said motor in response to the force required to stall said motor when the force required to propel the load exceeds a predetermined value.

4. A conveyance system as in claim 1, wherein said sensor includes an inclinometer that senses an angle of inclination of the plane of conveyance with respect to gravity, said motor control operatively coupled to said inclinometer and adapted to limit the power output by the motor in response to the angle sensed by the inclinometer.

5. A conveyance system as in claim 1, wherein said propelling device includes a roller mechanism, said roller mechanism having a roller supported by a base, said roller mechanism having an spring for biasing said roller toward the plane of conveyance, said roller powered by torque provided by said motor.

6. A conveyance system as in claim 1, wherein said propelling device includes a roller mechanism, said roller mechanism having a roller normally mounted below the plane of conveyance and supported by a base, said roller mechanism having an actuator for moving said roller with respect to said base toward the plane of conveyance, said roller powered by torque provided by said motor.

7. A conveyance apparatus as in claim 6, further comprising a second motor operatively coupled to said actuator that drives said actuator to move said roller toward the plane of conveyance.

8. A conveyance system as in claim 6, wherein said roller is mounted on a frame carried by said base, said frame being translatable with respect to said base and having a pivot axis, said roller having a roller axis, the center of gravity of said frame being disposed between said pivot axis and said roller axis.

9. A conveyance system as in claim 8, wherein:
   said actuator includes a cam carried by said frame, said cam mounted on a rockable shaft and adapted to translate said frame toward the plane of conveyance upon rocking movement of said shaft in either direction away from a normal position of rest; and,
   said roller is rotatable in two directions, each direction of rotation of said roller being associated with rotation of said shaft, such that upon rotation of said roller in either direction from a position of rest, said shaft is urged to rotate to cause translation of said frame toward the plane of conveyance.

10. A conveyance system as in claim 4, wherein:
    said motor is an electric motor; and
    said motor control includes a power control coupling said motor and an electric power source of said motor, said power control varying electric power supplied to said motor in response to the angle sensed by the inclinometer.

11. A conveyance system as in claim 10, wherein said power control includes means for varying voltage in linear relation to the square of a slope associated with the inclination of the plane of conveyance.

12. A conveyance system as in claim 10, wherein said power control includes an rectifier circuit that passes sinusoidal electric power to said motor as determined by a conduction angle varied in response to the angle sensed by the inclinometer.

13. A conveyance system as in claim 10, wherein said power control includes a pulse width modulation device that passes only power to said motor that is within a duty cycle varied in response to the angle sensed by the inclinometer.

14. A conveyance system as in claim 10, wherein said power control includes a sine control pulse width modulation device that passes only power to said motor that is within a sinusoidal duty cycle varied in response to the angle sensed by the inclinometer.

15. A conveyance system as in claim 10, wherein said power control includes a delay circuit that causes said power control to pass full electric power from said power source to said motor for a selected period of time, after which said power control varies said electric power in response to the angle sensed by the inclinometer.

16. A conveyance system for conveying a load along a plane of conveyance, comprising:
    propelling means for propelling the load along the plane of conveyance, said propelling means including a roller element and a motor that provides torque to the roller element to propel the load;
    sensing means for sensing a computer of gravitational force presented by an angle of inclination of the plane of conveyance and for providing a signal indicative of the magnitude of said component of gravitational force; and
    power variance means for varying torque provided by the motor in response to said signal indicative of magnitude.

17. In a conveyance system that includes a plurality of propelling devices constituting at least one propelling device set, the propelling devices adapted to propel, when supplied with electric power, a load along planes of conveyance defined by the propelling devices, each propelling device including a roller element that propels the load and being coupled to an electric motor that provides torque to the rolling element to propel the load a power control device comprising:
    selecting means for selecting one of said at least one propelling device set to be used to propel a load;
    sensing means for sensing a component of gravitational force presented by an angle of inclination of the plane of conveyance and for providing a signal indicative of the magnitude of said component of gravitational force; and
    power variance means for varying electric power provided to the motor powering each propelling device in the selected set, said power variance means coupled to said sensing means to receive said signal indicative of magnitude and to vary the supplied power in response thereto.

18. A power control device as in claim 17, wherein said sensing means includes an inclinometer that measures an angle of inclination of the plane of conveyance defined by propelling devices in a selected set, said sensing means thereby sensing a component of gravitational force opposing the conveyance of the load from the slope of a conveyance path of the load and providing a signal indicative thereof.

19. A power control device as in claim 17, wherein said power variance means varies electric power provided to motor powering each propelling device of a selected set such that the force used to propel the load bears a generally linear relation to the component of gravitational force which opposes conveyance of the load.

20. A power control device as in claim 17, wherein said power variance means varies, in a generally linear fashion, voltage with the square root of the component of gravitational force which opposes conveyance of the load.

21. A power control device as in claim 18, wherein:
said inclinometer measures an angle of inclination of a reference plane of conveyance, said sensing means determining therefrom and providing a signal indicative of both the gravitational force of the reference set, and also of a selected set, which bear a defined relation to one another; and
said power Variance means includes means for varying of the supplied electric power in response to said signal and said defined relation.

22. A power control device as in claim 21, wherein said sensing means includes a first inclinometer oriented to sense tilt of the reference plane of conveyance along the longitudinal (front-to-back) length of the aircraft and a second inclinometer oriented to sense roll of the reference plane of conveyance along the transverse (wing-to-wing) length of the aircraft.

23. A power control device as in claim 17, wherein:
said power control device further comprises a relay that couples said power variance means to each set;
said selecting means is coupled to said relay, said relay coupling electric power from the power variance means only to those motors powering propelling devices in a selected set to thereby energize each propelling device of the selected set; and
said power variance means includes a delay circuit that permits said power variance means to vary supplied electric power only after a defined period of time has elapsed following energization of a selected propelling device set.

24. A power control device as in claim 18, wherein said power variance means includes means for varying electric power such that a defined minimum amount of electric power is supplied to the motors unless the angle sensed by said inclinometer indicates an uphill conveyance path.

25. A conveyance system for conveying a load along a plane of conveyance, comprising:
power means for supplying power, said power means including means for generating power and means for varying the generated power;
at least one propelling device, said propelling device operable to propel the load along the plane of conveyance when energized with power from said power means;
a selection control that is operable to select one of a first state of said propelling device, in which said propelling device is coupled to said power means so as to propel the load in one direction, and a second state, in which said propelling device is coupled to said power means so as to propel the load in a second direction;
sensing means for sensing at least one angle of inclination within said conveyance plane, said sensing means providing an electronic signal representative of each sensed angle; and,
a power variance circuit coupled to said means for varying the generated power and operable to control said means for varying the generated power, so as to supply power to said propelling device in response to said electronic signal.

26. A conveyance system as in claim 25, wherein:
said conveyance system includes a plurality of sets of propelling devices, each set including at least one propelling device; and,
said selection control includes means for selecting a set of propelling devices from among said plurality of sets, said selection control operable to select one of said first and second states of propelling devices in the selected set.

27. A conveyance system as in claim 26, wherein said means for selecting a set of propelling devices from among said plurality of sets includes a multiple-selection, normally open switch, said switch coupled to at least one relay that couples power from said power means to propelling devices in a selected set in response to closing of said switch to thereby energize said propelling devices.

28. A conveyance apparatus as in claim 25, further comprising at least one such means for varying generated power, each means for varying generated power mounted on a corresponding propelling device and coupling said propelling device and said means for generating power.

29. A conveyance apparatus as in claim 26, wherein:
said sensing means includes at least one inclinometer; and
said power variance circuit includes
a logic circuit that is coupled to said selection control and to each inclinometer, said logic coupled to said selection control to receive said electronic signal and a second electronic signal indicative of the selected one of said first and second states,
switching means coupled to said logic and to said means for varying generated power for switching one of a plurality of control signals to said means for varying generated power,
wherein said means for varying generated power varies the power supplied to the selected set in accordance with said selected control signal, and
wherein said logic is operable to control said switching means to switch a defined one of said control signals to said means for varying generated power in response to said electronic signal, the selected set and the selected one of said first and second states of the selected set.

30. A conveyance apparatus as in claim 29, wherein:
said control signals include a first signal that causes a selected minimum voltage to be supplied to the selected set and a second signal that causes a first variable voltage to be supplied to the selected set in response to a positive angle of inclination; and said logic includes means for selecting said second signal if the selected one of said first and second states and the selected set are such as to cause the load to be propelled against an uphill slope.

31. A conveyance apparatus as in claim 30, wherein:

said means for generating power includes a three-phase power supply; and said means for varying power includes SCR means for regulating voltage of said three-phase power in response to the selected control signal; and said means for selecting a set of propelling devices from among said plurality of sets includes a multiple-selection switch, said switch coupled to a plurality of relays corresponding to each set that couple power from said means to propelling devices in each set in response to closing of said switch to thereby energize said propelling devices.

* * * * *